(12) United States Patent
Bock et al.

(10) Patent No.: US 7,738,599 B2
(45) Date of Patent: Jun. 15, 2010

(54) METHOD AND CIRCUIT FOR GENERATING AN AUXILIARY SYMBOL FOR ADJUSTING A QAM DEMODULATOR

(75) Inventors: Christian Bock, Freiburg (DE); Carsten Noeske, Sexau (DE); Miodrag Temerinac, Gundelfingen (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1106 days.

(21) Appl. No.: 10/532,554

(22) PCT Filed: Oct. 8, 2003

(86) PCT No.: PCT/EP03/11099

§ 371 (c)(1),
(2), (4) Date: Jul. 25, 2005

(87) PCT Pub. No.: WO2004/038993

PCT Pub. Date: May 6, 2004

(65) Prior Publication Data

US 2006/0018408 A1 Jan. 26, 2006

(30) Foreign Application Priority Data

Oct. 24, 2002 (DE) .............................. 102 49 492

(51) Int. Cl.
*H03D 3/00* (2006.01)
(52) U.S. Cl. ..................... 375/322; 375/261; 375/316; 375/324; 375/340
(58) Field of Classification Search .................. 375/216, 375/322, 340
See application file for complete search history.

(56) References Cited

U.S. PATENT DOCUMENTS 4,646,173 A 2/1987 Kammeyer et al. ........... 360/51

(Continued)

FOREIGN PATENT DOCUMENTS

DE 195 30 250 2/1997 .................. 27/38

(Continued)

OTHER PUBLICATIONS

K. D. Kammeyer, "Nachrichtenübertragung", published by B. G. Teubner, Stuttgart, 2nd edition, 1996, pp. 196-215, 424-438.

*Primary Examiner*—David C Payne
*Assistant Examiner*—Leon Flores
(74) *Attorney, Agent, or Firm*—DLA Piper LLP (US)

(57) ABSTRACT

In a quadrature amplitude (QAM) demodulator, an auxiliary symbol may be utilized in place of the decision symbol to adjust the decision-feedback loops within the demodulator. For the formation and definition of the auxiliary symbol, the radius and angle information of the received signal or of the preliminary symbol may be used. Through use of the auxiliary symbol instead of the decision symbol, any error in the angle information due to the unknown frequency and phase deviation of the local oscillator may be ignored. An auxiliary symbol generator may be provided which, instead of assigning to the received signal an element from the predetermined symbol alphabet, generates an auxiliary symbol that lies on the most probable one of the nominal radii. Nominal radii may mean those radii on which in QAM the predetermined symbols of the alphabet lie in the plane determined by the quadrature signal pair. For the angle component of the auxiliary symbol, the angle information of the sampled digital signal may be used. In polar coordinates, the auxiliary symbol may thus correspond to the vector intersection point of the sampled digital signal with the most probable nominal radius.

18 Claims, 4 Drawing Sheets

U.S. PATENT DOCUMENTS

| | | | |
|---|---|---|---|
| 4,843,616 A * | 6/1989 | Hoffmann | 375/327 |
| 4,958,360 A * | 9/1990 | Sari | 375/344 |
| 5,471,508 A | 11/1995 | Koslov | 375/344 |
| 5,519,356 A * | 5/1996 | Greenberg | 329/304 |
| 5,640,417 A * | 6/1997 | Barabash et al. | 375/222 |
| 5,748,674 A | 5/1998 | Lim | |
| 7,283,599 B1 * | 10/2007 | Herbig | 375/321 |
| 2001/0017897 A1 * | 8/2001 | Ahn | 375/261 |
| 2003/0058967 A1 * | 3/2003 | Lin et al. | 375/327 |
| 2005/0220220 A1 * | 10/2005 | Belotserkovsky | 375/316 |

FOREIGN PATENT DOCUMENTS

| | | | |
|---|---|---|---|
| DE | 195 40 250 | 2/1997 | 27/38 |
| EP | 0 537 587 A2 | 4/1993 | |
| EP | 0 583 643 A1 | 2/1994 | |
| JP | 6500914 | 7/1994 | |
| WO | WO97/16002 | 5/1997 | |
| WO | WO 00/67441 | 11/2000 | 27/233 |

* cited by examiner

METHOD AND CIRCUIT FOR GENERATING AN AUXILIARY SYMBOL FOR ADJUSTING A QAM DEMODULATOR

PRIORITY INFORMATION

This application claims priority from International application PCT/EP03/11099, filed Oct. 8, 2003 and German application 102 49 492.4, filed Oct. 24, 2002.

BACKGROUND OF THE INVENTION

This invention relates in general to digital signal processing and in particular to generating an auxiliary symbol in place of a decision symbol for adjusting a QAM demodulator as a part of a receiver in which the decision-feedback loops are not yet synchronized.

Decision-feedback loops utilized in quadrature amplitude modulation (QAM) receivers typically need to be quickly brought into synchronization or "lock" when digital signals locked to a quadrature signal pair are received. Such loops are used, for example, for the adjustment of sampling instants, for the adjustment of an equalizer that removes linear distortion during the reception of the quadrature signal pair, or in an automatic gain control circuit to adapt the received signals to the dynamic range.

In encoded form, these digital signals, which may also be referred to as symbols, may represent a single-bit or multiple-bit binary value. Encoding for transmission may be accomplished via the quadrature signal pair, which corresponds to a vector that at given instants of time takes up discrete positions in the amplitude and phase space of the quadrature signal pair. These instants of time typically follow each other at equal intervals and generally are sampled by the sampling clock pulses as precisely as possible. Besides QAM, another typical transmission method is phase-shift keying (PSK).

In a conventional receiver for receiving digital signals, a complex multiplier or mixer, which may be controlled by a local oscillator, may downconvert the received QAM signal, which may be modulated onto a carrier frequency for transmission, to the baseband frequency. If digital signal processing is used, this downconversion can take place prior to or after analog-to-digital conversion, with the signal advantageously being sampled and digitized at the symbol rate or a multiple thereof. If the digitization rate is an even-numbered multiple of the symbol rate, each of the symbol clock pulses typically coincides with a sample value. The digitization rate may advantageously be locked to the recovered symbol rate via a phase-locked loop. Instead, if the digitization rate is free running in relation to the symbol rate, the symbol may be formed as time information via an all-digital sample-rate conversion. In this manner, a temporal interpolation between the digitized sample values of the received digital signal may be controlled. Automatic gain control circuits help to achieve a relatively high utilization of the respective dynamic range and to map the received symbols onto the symbol decision stage. An adaptive equalizer typically reduces intersymbol interference, which may result from linear distortion caused by the transmitter, the transmission path, or the receiver.

In prior art demodulators for QAM or PSK signals, the circuits for controlling the frequency and phase of the local oscillator (e.g., the automatic gain control, the symbol clock recovery, and the adaptive equalizer) typically look at the differences between the received symbol and that element of the predetermined symbol alphabet which may be regarded by a decision stage as the most probable symbol that matches the received symbol. This type of control over the decision symbol is usually referred to as decision-feedback control. Since in prior-art digital demodulators the decision-feedback loops are coupled together, bringing these loops into a synchronization or lock condition may be difficult to achieve in a relatively rapid timeframe as long as the control for the carrier of the local oscillator is not yet stable in frequency and phase.

Frequently, the synchronization or lock condition of the decision-feedback loops can be achieved if the respective frequencies and phases are relatively close to their desired values. Examples of decision-feedback loops are found in a book by K. D. Kammeyer, "Nachrichtenübertragung", published by B. G. Teubner, Stuttgart, 2nd edition, 1996, pages 429 to 433, in Chapter 5.7.3, "Adaptiver Entzerrer mit quantisierter Rückführung", pages 200 to 202, in Chapter 5.8.3, "Entscheidungsrückgekoppelte Taktregelung", pages 213 to 215, and in Chapter 12.2.2, "Entscheidungsrückgekoppelte Trägerphasenregelung im Basisband", pages 429 to 431.

What is needed is a QAM demodulator that utilizes a relatively more reliable auxiliary symbol instead of a relatively less reliable decision symbol to adjust the decision-feedback loops within the demodulator.

SUMMARY OF THE INVENTION

In a QAM demodulator, an auxiliary symbol may be utilized in place of the decision symbol to adjust the decision-feedback loops within the demodulator. For the formation and definition of the auxiliary symbol, the radius and angle information of the received signal or of the preliminary symbol may be used. Through use of the auxiliary symbol instead of the decision symbol, any error in the angle information due to the unknown frequency and phase deviation of the local oscillator may be ignored. An auxiliary symbol generator may be provided which, instead of assigning to the received signal an element from the predetermined symbol alphabet, generates an auxiliary symbol that lies on the most probable one of the nominal radii. The term nominal radii as used herein may mean those radii on which in QAM the predetermined symbols of the alphabet lie in the plane determined by the quadrature signal pair. For the angle component of the auxiliary symbol, the angle information of the sampled digital signal may be used. In polar coordinates, the auxiliary symbol may thus correspond to the vector intersection point of the sampled digital signal with the most probable nominal radius.

The decision as to which nominal radius may be the most probable may be made via range limits which for example may be determined by the possible radii of the respective QAM standard, in particular by defining limit radii. These limit radii may form annuli of different widths in the quadrature signal plane which may contain one nominal radius each. It is also possible for the range limits to be determined not only by the nominal radii but also by the positions of these elements in the quadrature signal plane. In that case, the range limits may no longer define annuli but may distort the annuli. This may mean, however, that the respective angle information may influence the auxiliary symbol decision, but with little weight. Furthermore, entire regions of the quadrature signal plane can be excluded from the auxiliary decision (i.e., "masked out") because their evaluation may be uncertain.

As discussed herein, a determination of where the individual nominal radii and range limits lie may be made, so that the most probable nominal radius can be selected. Where the auxiliary symbol decision may be made via the most probable nominal radius using annuli, the radii limits may be determined, which advantageously may lie midway between two adjacent nominal radii. The respective radii or range limits may be retrieved from a table or may be continuously recalculated in accordance with the transmission standard.

In higher-order QAM, some of these annuli may be so narrow that their evaluation in the presence of usual interference may be uncertain. However, since the contribution of these annuli to the control process may be relatively small, this uncertainty may be of little or no consequence. Nevertheless, the effect of the uncertain annuli can be further reduced by suitable weighting of the control information, or these annuli may be masked out. Furthermore, annuli can be permitted which enclose the respective nominal radius more narrowly and thus cover it with relatively greater certainty. If the measured radius lies outside these narrower radii limits, no auxiliary symbol may be defined, due to the relative uncertainty.

For a received digital signal with the quadrature components $I=R \cos \alpha$ and $Q=R \sin \alpha$ that falls into an annulus of nominal radius Rsi, an auxiliary-symbol generator may form, at the position with the nominal radius Rsi and the angle $\alpha$, an auxiliary symbol with the polar coordinates Rsi, $\alpha$. For the auxiliary symbol to be used by the decision-feedback loops of the clock recovery, gain control, and/or equalizer, the quadrature components $I_h=Rsi \cos \alpha$ and $Q_h=Rsi \sin \alpha$ of the auxiliary symbol may be formed.

The radius R and the angle $\alpha$ of the auxiliary symbol may be determined mathematically from the quadrature components I, Q as follows:

$$R=\sqrt{(I^2+Q^2)}$$

$$\alpha=\arctan(Q/I)$$

There are also resolvers which may convert from Cartesian coordinates to polar coordinates using other methods. In the digital signal processing portion of such resolvers, the Cordic technique may be employed, as it uses binary additions and multiplications which can be implemented by simple arithmetic shifts. Furthermore, other approximation methods or tables are possible. For the inverse conversion, i.e., for the conversion from polar signal components R and $\alpha$ to their quadrature components $I=R \cos \alpha$ and $Q=R \sin \alpha$, a Cordic converter, a table, or an approximation method can be used.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
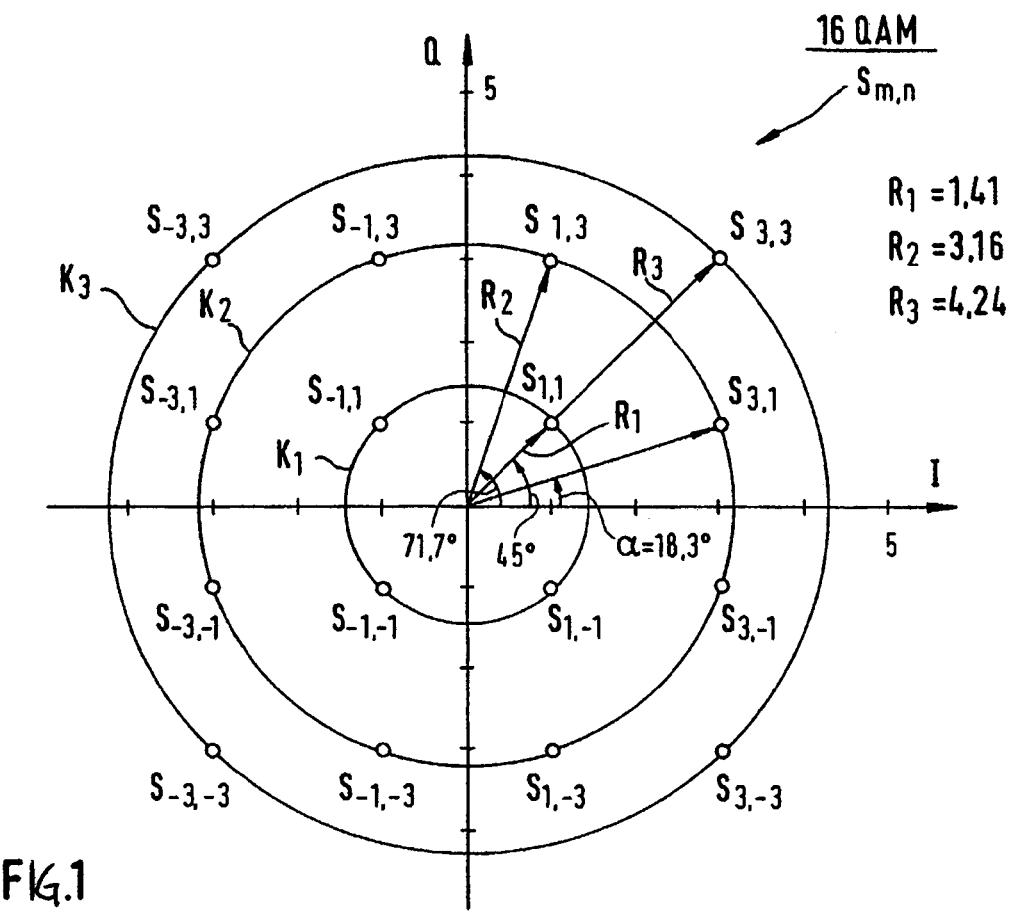
FIG. 1 illustrates the positions of the 16 symbols in the I/Q quadrature plane for a 16-QAM signal.

Referring to FIG. 1, a plane in which the positions of the 16 symbols $S_{m,n}$ of a 16-QAM signal are marked may be determined by a quadrature signal pair I, Q. The designations of the individual symbols $S_{m,n}$ differ from each other by the specifications of the respective Cartesian coordinates. The symbol $S_{-3,1}$, for example, has the value $-3$ as the I-coordinate and the value 1 as the Q-coordinate. FIG. 1 also illustrates three circles $K_1$, $K_2$, and $K_3$, on which the 16 symbols $S_{m,n}$ may be located. Associated with the circles may be the exemplary radius values of $R_1=1.41$, $R_2=3.16$, and $R_3=4.24$, which may be calculated starting from the origin. To define each of the 16 symbols $S_{m,n}$ via their corresponding polar coordinates R, $\alpha$, the respective angle components $\alpha$ may be utilized; for the symbols $S_{3,1}$, $S_{3,3}/S_{1,1}$, and $S_{1,3}$, for example, the angles are $\alpha=18.3°$, $\alpha=45°$, and $\alpha=71.7°$, respectively. The circles and associated radii on which the 16 symbols $S_{m,n}$ are located in FIG. 1 according to the respective transmission standard may be referred to hereinafter as nominal circles and nominal radii, respectively.

Figure 2:
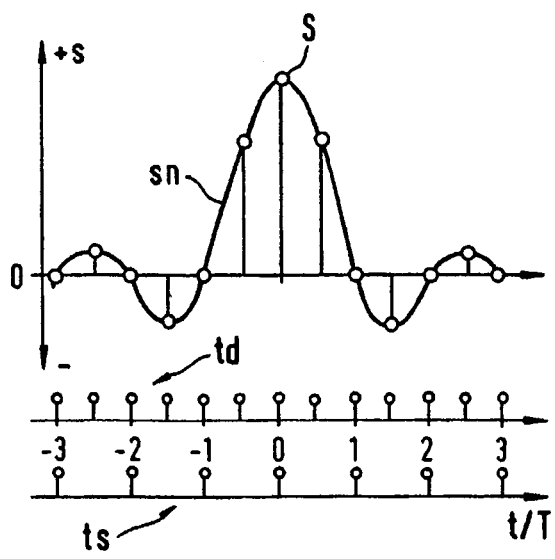
FIG. 2 is a graph of a Nyquist pulse with synchronized sampling.
Figure 3:
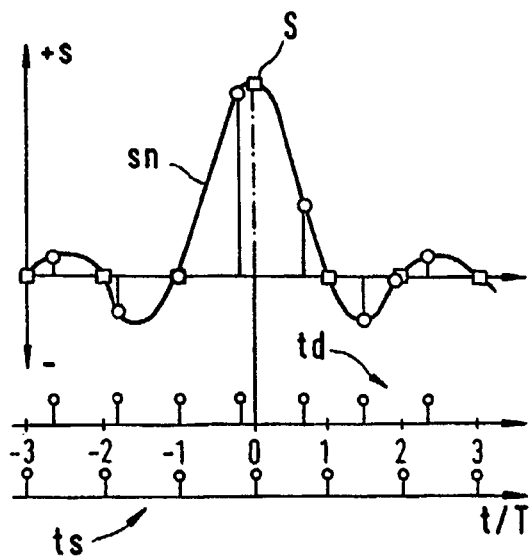
FIG. 3 is a graph of a Nyquist pulse with nonsynchronized sampling.

The graphs of FIGS. 2 and 3 each illustrate the signal s of a single Nyquist pulse sn. The continuous line represents the analog waveform of the digital signal, which may typically be transmitted as a continuous signal. A typical feature of the Nyquist pulse sn is that the signal may pass through zero at all symbol sampling instants $t/T=+/-n$ ($n=1, 2, 3 \ldots$) and that the signal may equal the actual symbol value S at the symbol sampling instant $t/T=0$. If the Nyquist pulse sn is sampled and digitized at an integral multiple of and synchronously with the symbol sampling rate ts as shown in FIG. 2, the sample value at the instant $t/T=0$ may provide the actual digital symbol S. The sample values between the symbol sampling instants $t/T=+/-n$, for example at $t/T=-0.5$ or $t/T=1.5$, may be insignificant for recognition of the actual symbol S and can be ignored.

However, a different result may be achieved if the Nyquist pulse sn is sampled and digitized as illustrated in the graph of FIG. 3. There, the sampling and digitization clock td may be synchronized with the symbol sampling clock ts neither in frequency nor in phase. Hence, the sampling instants td for the digitization may coincide with one of the regular symbol sampling instants $t/T$ by chance, if at all. Accordingly, reliable sensing of the actual digital symbol S at the instant $t/T=0$ by means of the existing sample values may not occur. In that case, symbol sampling devices may be necessary which perform a temporal interpolation of the sample values to determine the sample value at the instant $t/T=0$ as precisely as possible. Due to the relatively narrow Nyquist pulse, which may have zero crossings at $t/T=-1$ and $t/T=+1$, interpolation methods of higher order may be used so that the pulse peak S at $t/T=0$ may be reliably detected. The small round circles illustrated in FIGS. 2 and 3 correspond to the sample values sampled in accordance with the sampling and digitization clock td, whereas the small squares illustrated in FIG. 3 correspond to interpolated sample values that correspond to the symbol sampling clock ts, these sample values may be available as data for further processing. During the transmission of a digital data stream, the individual Nyquist pulses sn may be combined and transmitted as I and Q components.

Figure 4:
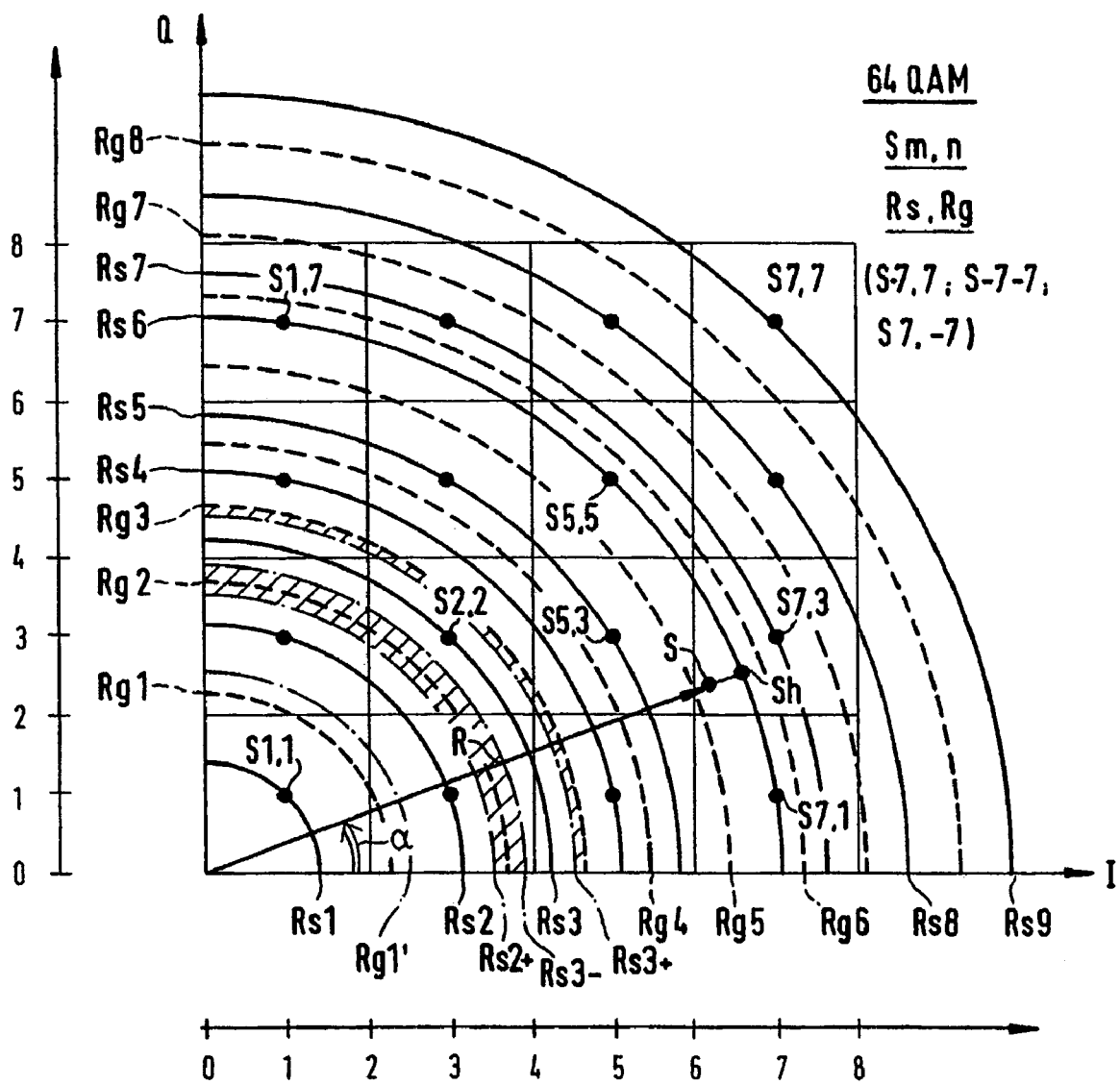
FIG. 4 illustrates the positions of 16 symbols of a 64-QAM signal in the first quadrant.

FIG. 4 illustrates in the I/Q plane the positions of the 16 symbols $S_{m,n}$ of a 64-QAM signal in the first quadrant. It is generally irrelevant which quadrant the 64 elements $S_{m,n}$ of the symbol alphabet are located in. For example, in the case of symbol $S_{7,7}$, the symbols $S_{-7,7}$, $S_{-7,-7}$, and $S_{7,-7}$ located in the three other quadrants may be added in parentheses by way of illustration. FIG. 4 illustrates for the individual symbols $S_{m,n}$ the Cartesian coordinate grid determined by the two quadrature signal components I, Q.

The horizontal and vertical illustrated grid lines may be defined by a scale of from 0 to 8 on each of the two coordinate axes I, Q. FIG. 4 also illustrates a number of nominal circular arcs Rs that pass through the corresponding 16 symbols $S_{m,n}$ in the first quadrant. For the 16 symbols illustrated in FIG. 4 in the first quadrant, and hence for all 64 symbols of the QAM signal, there are nine nominal arcs Rs1 to Rs9, which are illustrated in FIG. 4 as continuous lines. Associated with each nominal arc is a nominal radius, similarly designated as Rs1 to Rs9. Three arcs may intersect a single symbol $S_{m,n}$ in the first quadrant. That is, arc Rs1 may intersect symbol $S_{1,1}$, arc Rs3 may intersect symbol $S_{2,2}$, and the outermost arc Rs9 may intersect symbol $S_{7,7}$. All of the other arcs may intersect two symbols except for arc Rs6 which may intersect three symbols.

Arcs which may lie midway between two nominal arcs may be illustrated in FIG. 4 by broken lines, these arcs being designated from Rg1 to Rg8. For a received symbol S which may differ from the predetermined symbol alphabet $S_{m,n}$ due for example to interference or because control loops are not locked, if a different radius is measured the circular arcs Rg1 to Rg8 represented by broken lines may then correspond to limit lines which include the most probable nominal radius Rs1 to Rs9. The radii of these range limits may be referred to hereinafter as limit radii Rg1 to Rg8.

The definition of the midway point between two nominal arcs as a limit radius is exemplary. For example, the respective limit radii may be shifted from the middle in either direction, as indicated by the dash-dot arcs in FIG. 4. The limit radius Rg1', for example, may increase the detection range around the corresponding nominal radius Rs1. If the limit radius Rg2 is replaced, for example, by the two limit radii Rs2+ and Rs3−, then an annulus (illustrated with hatched lines) may be defined as being between these two limit radii Rs2 and Rs3 in which a decision on the most probable nominal radius may be suppressed. Also, the limit radii Rs3− and Rs3+ may narrow down the evaluation range for the nominal radius Rs3, where the number of incorrect decisions may be reduced. Further, between the third and fourth nominal radii Rs3 and Rs4, another narrow masked-out region, which lies between the limit radius Rs3+ and the midway limit radius Rg3, may be illustrated by hatched lines by way of example. The nominal radii Rs6 and Rs7 may differ by a relatively small amount. Thus, these relatively uncertain regions may be excluded from the decision as to which may be the most probable nominal radius. This region could be defined by the limit radii Rg5 and Rg7, for example.

If the selection of the most probable nominal radius Rsi is made by the radius R and by the angle α, the range limits may no longer be circular arcs but may deform somewhat. In the vicinity of a symbol to be expected, $S_{m,n}$, the regions may increase in size, and if the possible symbol $S_{m,n}$ is relatively far away in terms of angular distance, the regions may decrease correspondingly.

As an example, FIG. 4 illustrates the formation of an auxiliary symbol Sh from a received signal s or a preliminary symbol S. The preliminary symbol S has the radius component R and the angle component α and may lie within the range limits Rg5 and Rg6. Therefore, the most probable nominal radius Rsi for the symbol S is the nominal radius Rs6. The position of the auxiliary symbol Sh may be defined by the most probable nominal radius Rs6 and the existing angle component α.

The polar coordinates Rs6 and α of the auxiliary symbol Sh can be converted into components of the quadrature signal pair I, Q with the aid of the Cartesian grid or via a suitable transformation. The auxiliary symbol Sh, except for the angle component α, may correspond to the symbols $S_{1,7}$, $S_{5,5}$, or $S_{7,1}$, which all lie on the same nominal radius Rs6. This is an essential difference from conventional symbol decision devices, which perform a distance decision. In such distance decision devices, the preliminary symbol S may be assigned to the symbol $S_{7,3}$ or the symbol $S_{5,3}$, which are both nearer than the symbols $S_{1,7}$, $S_{5,5}$, or $S_{7,1}$ on the nominal arc Rs6 and which are on arcs Rs7 and Rs5, respectively.

Figure 5:
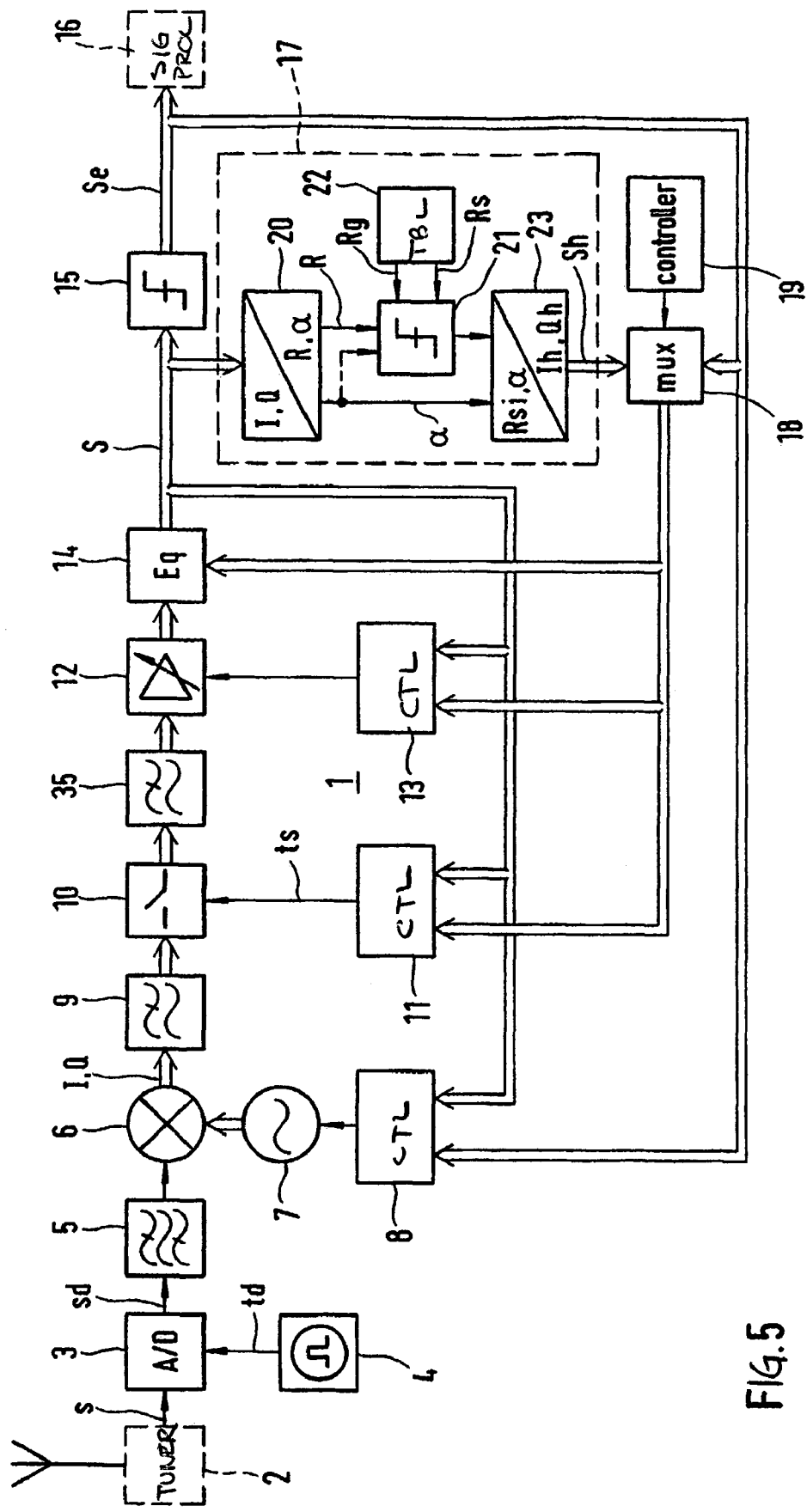
FIG. 5 is a block diagram of an embodiment of a demodulator with an auxiliary-symbol generator.

Referring to FIG. 5, an embodiment of a QAM demodulator circuit 1 for receiving digital signals s includes an auxiliary-symbol generator. A signal source 2, for example a tuner, may provide the digital signal s in a band-limited intermediate-frequency position. There it is sampled and digitized by an analog-to-digital converter (ADC) 3. A digitization clock td may be provided by a clock generator 4 to the ADC 3. The digitization clock td may be identical to the system clock for the demodulator 1. The output of ADC 3 may be a digitized signal sd provided to a bandpass filter 5 which removes DC components and undesired harmonics therefrom.

A quadrature mixer 6 may downconvert the filtered digitized signal sd to the baseband frequency and divide it into the two quadrature signal components I, Q. For the frequency conversion, the quadrature mixer 6 may be provided with two carrier signals 90 degrees apart in phase from a local oscillator 7 whose frequency and phase may be controlled by a carrier controller 8. Undesired harmonics may be removed from the quadrature signal pair I, Q by a low-pass filter 9. The filtered quadrature signal pair I, Q may be provided to a symbol sampling device 10 controlled by a sampling controller 11 that defines the symbol sampling instants ts (FIGS. 2, 3). The symbol sampling instants ts may typically be determined by the symbol rate 1/T and the phase position of the received digital signal s. Since the digitization rate td may not be synchronized with the symbol rate 1/T (FIG. 3), a temporal interpolation between the sample values may be performed in the sampling device 10 at the symbol rate or an integral multiple thereof (FIG. 3).

The output of the sampling device 10 may be filtered by a low-pass filter 35 with a predetermined Nyquist characteristic. The output of the filter 35 may be provided to a gain-controlled amplifier 12 with feedback. The amplifier 12 may be controlled by a gain controller 13. Gain control assists with the utilization of the dynamic range of a symbol decision stage 15. After an equalizer 14, the two components of the quadrature signal pair I, Q may in general be free of distortion and may be available as a preliminary symbol S. From the preliminary symbols S, the symbol decision stage 15 may form corresponding decisions symbols Se, which may be applied directly or through a multiplexer 18 to additional digital signal processing devices 16 and to the decision-feedback controllers 8, 11, 13, 14 within the demodulator circuit 1. Since an angle component α typically may not be dispensed with in the control process performed in the carrier controller 8, the carrier controller 8 may not be connected to a multiplexer 18.

The generation of the auxiliary symbol Sh may be performed by an auxiliary-symbol generator 17. An input stage of the auxiliary-symbol generator 17 may comprise a resolver 20 that converts the sampled quadrature signal pair I, Q of the preliminary symbol S into corresponding polar coordinates R, α. A radius decision stage 21 may determine the most probable nominal radius Rsi from the polar coordinates R, α, for example, from the radius component R. The limit radii Rg and the associated nominal radii Rs may for example be retrieved from a table 22. The most probable radius Rsi, together with the angle component α, may be provided to an inverse resolver 23 that forms the corresponding quadrature components $I_h$, $Q_h$ from the polar coordinates Rsi, α. The quadrature components of the generated auxiliary symbol may be applied to one input of the multiplexer 18, whose other input may be provided with the quadrature components of the decision symbol Se. Thus, in the adjustment phase, the controllers 11, 13 and the equalizer 14 may be provided with the relatively reliable auxiliary symbol Sh instead of the relatively unreliable decision symbol Se.

Figure 6:
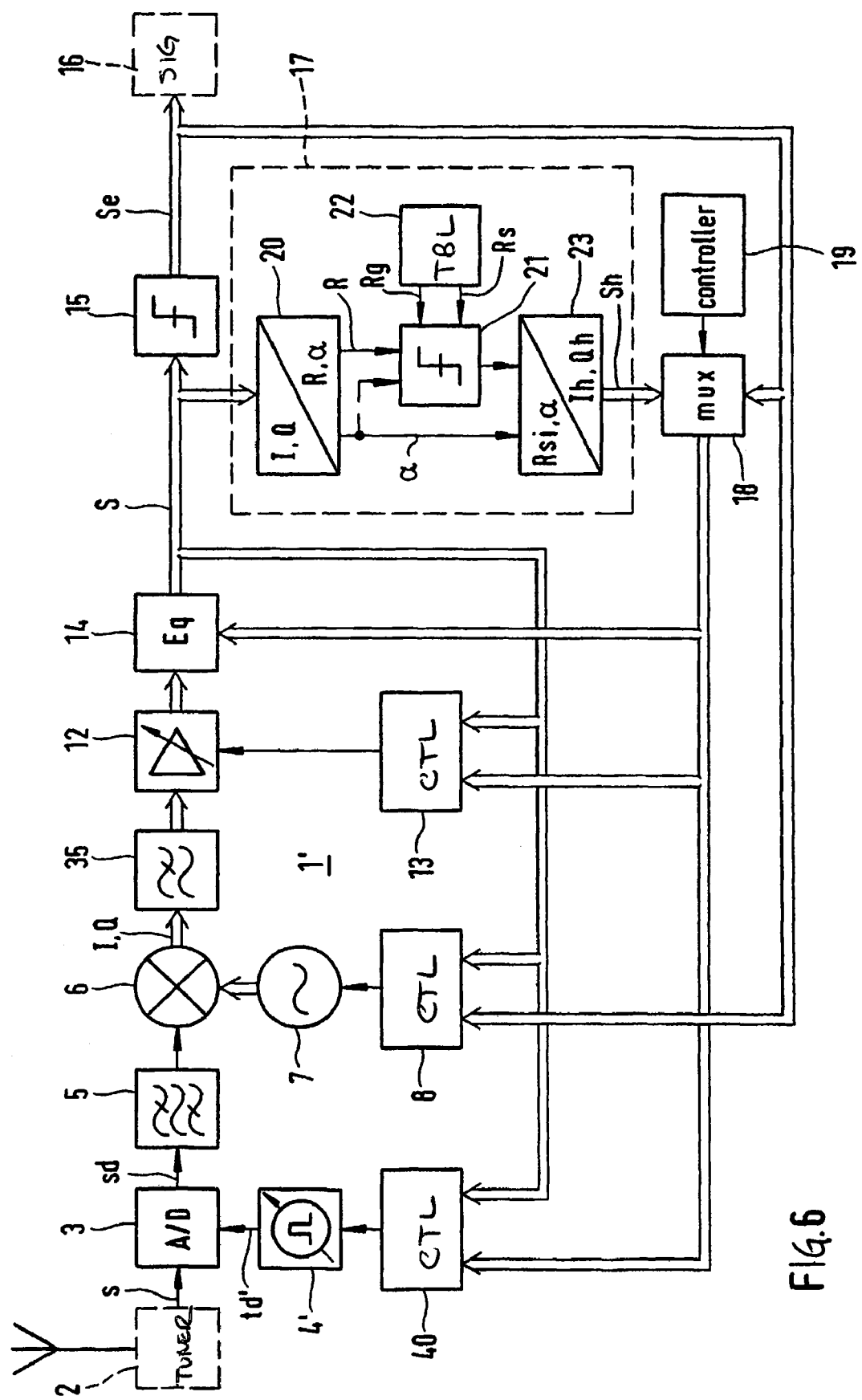
FIG. 6 is a block diagram of another embodiment of a demodulator with an auxiliary-symbol generator.

Referring to FIG. 6, another embodiment of a demodulator circuit 1' for receiving digital signals s incorporates an auxiliary-symbol generator 17 as in FIG. 5. As an alternative to the sampling and digitization with a constant frequency and phase digitization clock td according to FIG. 5, the demodulator circuit 1' of FIG. 6 may be provided with a frequency- and phase-controlled sampling and digitization clock td' from a controlled oscillator 4'. A controller 40 synchronize the digitization rate td' with the symbol sampling instant t/T or a multiple thereof (FIG. 2). The subsequent interpolation of the quadrature signal pair I, Q in the sampling device 10 of FIG. 5 can thus be eliminated. Also, the sampling device 10 may be omitted as a separate functional unit, since its function may be performed by the equalizer 14, which may operate at the symbol rate 1/T. Further, the low-pass filter 9 after the quadrature mixer 6 may no longer be utilized, as its limiting action may be provided by the low-pass filter 35 with the Nyquist characteristic.

The inputs of the controller 40 may be provided with the preliminary symbol S and, at start-up, the auxiliary symbol Sh. When the resulting digitization rate td' may be synchronized with the symbol rate 1/T, switchover from the auxiliary symbol Sh to the decision symbol Se may occur by the multiplexer 18, as also in the case of the controllers 13 and 14.

Except for the differences described, the embodiment of FIG. 6 may be considered to be similar to the embodiment of FIG. 5. Therefore, corresponding functional units are designated by like reference characters.

The interface 3 for the digitization in FIGS. 5 and 6 may also the quadrature mixer 6, for instance if the intermediate frequency after the signal source 2 may be relatively high. The function and generation of the auxiliary symbol Sh may not be directly affected thereby. Due to the partially analog signal paths, however, errors and asymmetries may occur, for example in the quadrature components I, Q, which may not be removed by the equalizer 14 and thus may increase the uncertainty in the symbol recognition.

Although the present invention has been shown and described with respect to several preferred embodiments thereof, various changes, omissions and additions to the form and detail thereof, may be made therein, without departing from the spirit and scope of the invention.

What is claimed is:

1. A method of generating an auxiliary symbol when a digital signal locked to a quadrature signal pair is received, the method comprising:
   providing nominal radii and range limits according to predetermined positions of the digital signal in a plane determined by the quadrature signal pair;
   determining a preliminary symbol from the digital signal by sampling the digital signal as controlled by a symbol sampling clock;
   determining polar coordinates of the preliminary symbol;
   determining a nominal radius from the polar coordinates of the preliminary symbol according to the range limits, where the determined nominal radius and an angle component define polar coordinates of the auxiliary symbol in the plane of the quadrature signal pair;
   selecting one of the auxiliary symbol and the preliminary symbol to provide a selected symbol; and
   adjusting at least one decision-feedback controller of a demodulator in response to the selected symbol.

2. The method of claim 1, further comprising the step of converting the polar coordinates of the auxiliary symbol into a Cartesian coordinate system determined by the quadrature signal pair.

3. The method of claim 1, where the method further comprises the step of temporally interpolating the digitized signal as a function of a respective instant of the symbol sampling clock when a digitization clock and the symbol sampling clock are independent of each other.

4. The method of claim 1, where the step of determining a nominal radius from the polar coordinates determines the nominal radius from a radius component of the preliminary symbol.

5. The method of claim 1, further comprising the step of determining quadrature components of the auxiliary symbol from the determined nominal radius and the angle component.

6. The method of claim 1, where the determined nominal radii comprise radii on which predetermined symbols of the alphabet lie in the plane determined by the quadrature signal pair.

7. The method of claim 1, where at least one of the range limits is defined by a radius limit.

8. The method of claim 7, where at least one of the radius limits lies between adjacent ones of the nominal radii.

9. The method of claim 1, where the step of determining nominal radii and range limits determines the range limits by defining limit radii that may comprise radii of a predetermined modulation standard.

10. The method of claim 1, where adjacent ones of the limit radii define an annulus that includes at least one of the nominal radii.

11. A circuit for generating an auxiliary symbol from a preliminary symbol in a device for receiving a digital signal locked to a quadrature signal pair, comprising:
    a resolver that converts Cartesian quadrature signal components of the preliminary symbol into polar coordinates;
    a radius decision stage that determines from the polar coordinates of the preliminary symbol the most probable nominal radius, where the most probable nominal radius and an angle component of the preliminary symbol define polar coordinates of the auxiliary symbol; and
    a multiplexor that receives the preliminary symbol and the auxiliary symbol, and provides a selected symbol selected from the preliminary symbol and the auxiliary symbol; and
    a control unit that adjusts at least one decision-feedback controller of a demodulator in response to the selected symbol.

12. The circuit of claim 11, further comprising a second resolver that converts the polar coordinates of the auxiliary symbol to Cartesian coordinates in a plane determined by the quadrature signal pair.

13. A circuit for generating an auxiliary symbol from a preliminary symbol in a device for receiving a digital signal locked to a quadrature signal pair, comprising:
    a resolver that converts Cartesian quadrature signal components of the preliminary symbol into polar coordinates;
    a radius decision stage that determines from the polar coordinates of the preliminary symbol the most probable nominal radius, where the most probable nominal radius and an angle component of the preliminary symbol define polar coordinates of the auxiliary symbol; and a second resolver that converts the polar coordinates of the auxiliary symbol to Cartesian coordinates in a plane determined by the quadrature signal pair;

a multiplexer that receives the auxiliary symbol and the preliminary symbol, and provides a selected signal therefrom to the at least one decision-feedback controller for control thereof, where at least one decision-feedback controller in the device utilizes the selected signal for control thereof.

14. The circuit of claim 13, where the multiplexer selectively provides a decision symbol in place of the auxiliary symbol to the at least one decision-feedback controller.

15. A method for adjusting at least one decision-feedback controller within a demodulator using an auxiliary symbol in place of a decision symbol, the method comprising:

receiving a digital signal locked to a quadrature signal pair;

determining nominal radii and range limits according to predetermined positions of the digital signal in a plane determined by the quadrature signal pair;

determining a preliminary symbol from the digital signal;

determining the auxiliary symbol from the preliminary symbol;

selecting one of the auxiliary symbol and the preliminary symbol to provide a selected symbol; and adjusting the at least one decision-feedback controller in dependence on the selected symbol.

16. The method of claim 15, where the step of determining the auxiliary symbol from the preliminary symbol comprises the steps of:

determining polar coordinates of the preliminary symbol;

determining a nominal radius from the polar coordinates of the preliminary symbol in accordance with the range limits, the determined nominal radius comprising one of the nominal radii; and determining the auxiliary symbol in terms of polar coordinates thereof, the polar coordinates of the determined auxiliary symbol comprising the determined nominal radius and an angle component of the preliminary symbol.

17. The method of claim 16, where after the step of determining the auxiliary symbol in terms of polar coordinates thereof, the method further comprises the step of determining quadrature components of the auxiliary symbol from the determined nominal radius and the angle component.

18. The method of claim 15, where the determined nominal radii comprise radii in which predetermined symbols of the alphabet lie in the plane determined by the quadrature signal pair.

* * * * *